United States Patent
Terashima et al.

(10) Patent No.: US 6,538,762 B1
(45) Date of Patent: Mar. 25, 2003

(54) PRINTER CONTROLLER, AND PRINT SYSTEM

(75) Inventors: Takeshi Terashima, Nagano (JP); Takashi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/252,781

(22) Filed: Feb. 19, 1999

(30) Foreign Application Priority Data

Feb. 24, 1998 (JP) ............................................ 10-041959
Feb. 2, 1999 (JP) ............................................ 11-024864

(51) Int. Cl.[7] .......................... G06K 15/02; G06F 13/00
(52) U.S. Cl. ........................................ 358/1.15; 358/1.9
(58) Field of Search ............................... 358/1.15, 1.13, 358/1.9, 1.8, 1.11, 1.14, 1.16, 512, 518, 519, 501, 504; 710/15–19, 62–74; 382/167–172

(56) References Cited

U.S. PATENT DOCUMENTS 4,965,771 A * 10/1990 Morikawa et al. .......... 364/900
5,563,725 A * 10/1996 Kumada et al. ............. 358/518
5,822,507 A * 10/1998 Uda et al. ................... 395/114
5,996,029 A * 11/1999 Sugiyama et al. ............ 710/15

* cited by examiner

Primary Examiner—Gabriel Garcia
Assistant Examiner—Douglas Tran
(74) Attorney, Agent, or Firm—Sughrue Mion, PLLC

(57) ABSTRACT

A printer driver of a host computer sends as image data a command which includes full-color RGB raster data. A printer-control-only circuit formed in the form of a hardware circuit subjects the full-color RGB raster data received from the driver to color conversion, halftoning, and interlacing, thereby converting the RGB raster data into binary CMYK raster data. The printer-control-only circuit generates a printer command including as image data the binary CMYK raster data. The printer performs printing operations on the basis of the binary CMYK raster data included in the printer command from the printer-control-only circuit. Software stored in the printer driver and the printer do not perform any color conversion, halftoning, and interlacing operations.

16 Claims, 5 Drawing Sheets

PRINTER CONTROLLER, AND PRINT SYSTEM

BACKGROUND OF THE INVENTION

1. Field of the Invention

The present invention relates to a printer control technique which performs high-speed printing.

2. Related Art

A printer used with a computer system usually forms a pseudo-continuous tone image which visually appears to be a continuous tone, through use of a limited number of coloring agents, such as cyan, magenta, and yellow (CMY), or cyan, magenta, yellow, and black (CMYK), by printing or not printing a small point (dot) of each coloring agent at each pixel position on a sheet. Accordingly, image data finally required by the printer usually comprise CMYK raster image data which represent whether or not a dot of each color of CMYK coloring agents is printed or not printed at each pixel position (in some types of printer, the CMYK raster image data further represent which of a plurality of dot sizes is designated). Such CMYK raster image data require a color component resolution of only two or so (but not too many) levels. Throughout the specification, such CMYK raster image data will be referred to as CMYK raster image data having a "low-value resolution." Original image data, which are prepared by means of an application in a host computer which issues a print instruction to the printer or are input from the outside, are usually represented by a host color system differing from a printer color system; typically an RGB color system. Further, the original image data are RGB data having a "high-value resolution"; for example, a color component of 256-level gray scale. The original image data may be low-level data (raster image data) represented by a set of pixel values in one case and may be high-value data represented by a graphic function or character codes in another case.

In a conventional print system, the processing for converting high-value resolution RGB data of the original image into final CMYK data of a low-value resolution is performed by means of a printer driver which is made up of software installed in a host computer, or by means of imaging software installed in the printer. The processing comprises a "rasterization" step of converting high-level original image data into raster image data; a "color conversion" step of converting RGB-based pixel values into CMY-based or CMYK-based pixel values through use of a look-up table; and a "half-toning" step of converting pixel values of high-value resolution into pixel values of low-value resolution through use of error variance or dithering. Further, in order to improve picture quality, an ink-jet printer employs a so-called "interlace" printing technique or an "overlap" printing technique, according to which dots are printed in a sequence differing from that in which the pixels are arranged. Interleaving of pixel values in a rearranged sequence for the purpose of interlace printing or overlap printing is also carried out through the conversion process set forth.

If a printer driver carries out the foregoing conversion operations, the operations will burden the central processing unit of a host computer. Similarly, if a printer carries out the foregoing conversion operations, the operations will burden the central processing unit of the printer. These processing operations involve consumption of much time and account for a large portion of print time. A laser printer aimed at high-speed operations has a high-performance CPU and performs the foregoing conversion operations at high speed. Such a high-performance CPU is a primary factor for driving the cost of a laser printer considerably high. In contrast, in an ink-jet printer aimed at attaining a low price, a host computer processes all these operations. Consequently, the ink-jet printer is considerably slow in print speed, and the host computer is occupied for a long period of time, which in turn causes a delay in other tasks to be processed by the host computer.

SUMMARY OF THE INVENTION

Accordingly, the object of the present invention is to realize high-speed printing through use of inexpensive equipment.

Another object of the present invention is to realize high-speed printing without involvement of a heavy workload on a CPU of a host computer in an environment where a low-speed printer, such as a conventional ink-jet printer, is used.

Still another object of the present invention is to provide an inexpensive printer capable of performing printing operations at high speed.

Yet another object of the present invention is to provide an environment in which a new printer driver capable of achieving the foregoing objects can be used while use of a conventional printer driver is maintained.

According to the present invention, a printer controller is provided between a host and a printer. According to a command for the printer controller from the host, the printer controller receives high-order raster image data (e.g., full-color RGB raster image data) and converts the thus-received image data into low-order raster image data (e.g., binary or multi-value CMYK raster image data). The thus-converted raster image data are sent to the printer. Accordingly, neither the printer driver of the host nor the software of the printer is required to perform image conversion of high-order raster image data into low-order raster image data (e.g., color conversion and halftoning operations); rather, a hardware circuit designed specifically for carrying out a conversion process performs the conversion operation at high speed. The high-order raster image data sent from the host do not always correspond to RGB raster data but may alternatively correspond to raster image data of another color system, e.g., CMYK system raster image data or CMY raster image data.

The printer controller may be embodied in the form of external hardware which is connected between the host and the printer by way of, e.g., a parallel interface cable. Alternatively, the printer controller may also be built into the host and connected directly to a bus of the CPU of the host. Alternatively, the printer controller may be built into a printer and connected directly to a bus of a CPU of the printer.

Image conversion parameters required for correctly converting a high-order raster image into a low-order raster image are set in the printer controller by means of commands which the printer controller receives from the host. Accordingly, the printer controller can convert images through use of an optimum method according to parameters compliant with an image to be printed or the type of printer.

In a preferred embodiment, a backend parameter required for correctly printing low-order raster image data is also imparted to the printer controller according to the command from the host. On the basis of the backend parameter, the printer controller generates an initial setting command for initially setting the printer so as to enable the printer to correctly perform printing operations and sends the thus-generated initial setting command to the printer. Further, on the basis of the backend parameter, the printer controller decides a specification for interlace printing or overlap printing. According to the thus-determined specification, the printer controller selects pixels for low order raster data required by a print head of the printer in each path. The thus-selected pixel data are sent to the printer. Therefore, the printer is released also from processing for controlling the arrangement of pixels for interlace printing or overlap printing.

A method under which the printer controller sends low order raster image data to the printer includes a method of sending the raster image data in the form of a predetermined printer command which the printer CPU can comprehend. In this case, the printer controller may generate various printer commands in addition to the raster image data transfer command. Alternatively, the printer controller generates only a printer command for raster image data transfer purpose, and another printer command may be issued by a printer driver. In another method, on the basis of low order raster image data, the printer controller may directly drive the printing mechanism of the printer by bypassing the CPU of the printer.

In order to support a printer employing a conventional printer driver which sends a printer command, the printer controller may be provided with a through-path which sends a printer command received from the host directly to the printer.

DESCRIPTION OF THE PREFERRED EMBODIMENTS

Figure 1:
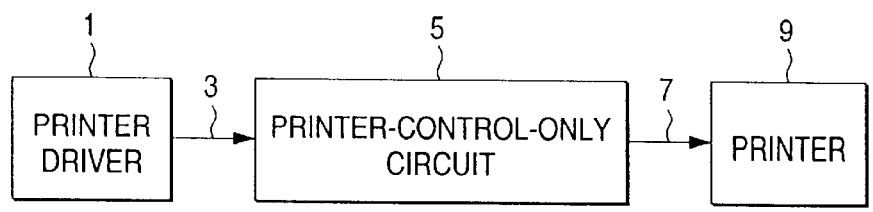
FIG. 1 is a block diagram showing the entire configuration of a print system according to one embodiment of the present invention.

FIG. 1 shows the entire configuration of a printing system according to one embodiment of the present invention.

As seen in FIG. 1, a circuit 5 specifically designed to control a printer (hereinafter referred to simply as a "control circuit") is provided between a printer 9 and a printer driver 1 serving as software provided in a host computer. The control circuit 5 is a hardware logic circuit such as a combination of, e.g., an application-specified IC (ASIC) and a semiconductor memory chip, and is not a computer which executes software by means of a central processing unit.

Upon receipt of a control command 3 for use with the control circuit 5 from the printer driver 1, the control circuit 5 prepares a printer command 7 for use with the printer 9 and sends the thus-generated printer command 7 to the printer 9. In principle, the image data included in the control circuit command 3 correspond to full-color RGB raster image data comprising a set of pixel values, thereby enabling 256-level gray scale. In contrast, the image data included in the printer command 7 correspond to binary CMYK raster image data comprising a set of pixels. Each color component is represented by one bit of the pixel value, which represents whether or not a dot is printed. Therefore, the control circuit 5 has the function of converting the full-color RGB raster data into binary CMYK raster data, i.e., the functions of color conversion and halftoning. Neither the printer driver 1 nor the software provided in the printer 9 is required to have such a function. For various reasons, the printer command 7 is usually fairly complicated and has a large number of bits. In contrast, the control circuit command 3 can be designated so as to become simpler and comprise fewer bits than the ordinary printer command. Consequently, printing operations can be carried out at high speed, and the host computer is released within a shorter period of time. Further, the entire printing system (incidentally, the control circuit 5 formed from ASIC is less expensive than a high-performance and high-speed CPU corresponding thereto).

Figure 2:
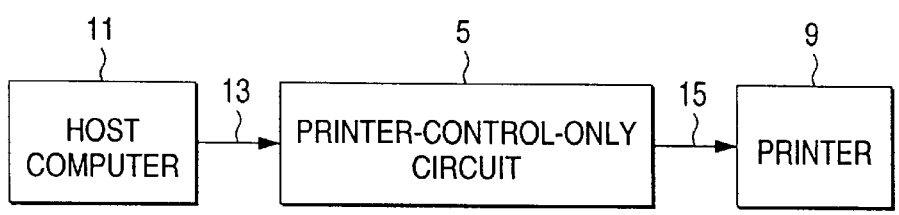
FIG. 2 is a block diagram showing a control circuit when it is connected as an external circuit to a host computer and a printer.
Figure 3:
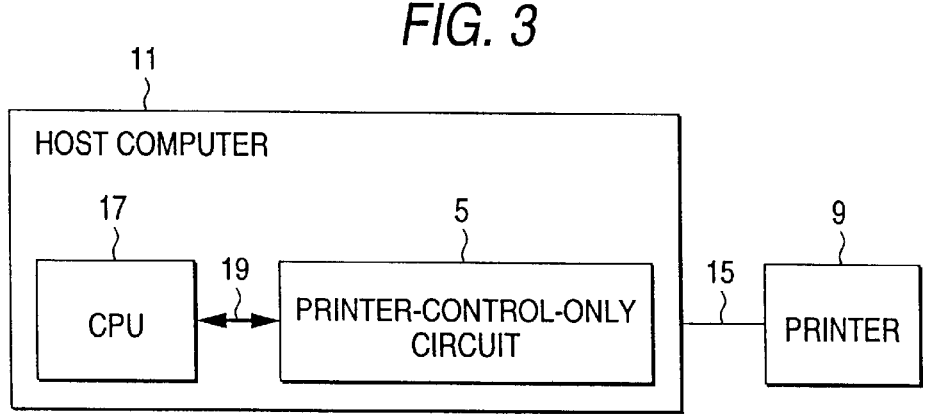
FIG. 3 is a block diagram showing the control circuit when it is built into the host computer.
Figure 4:
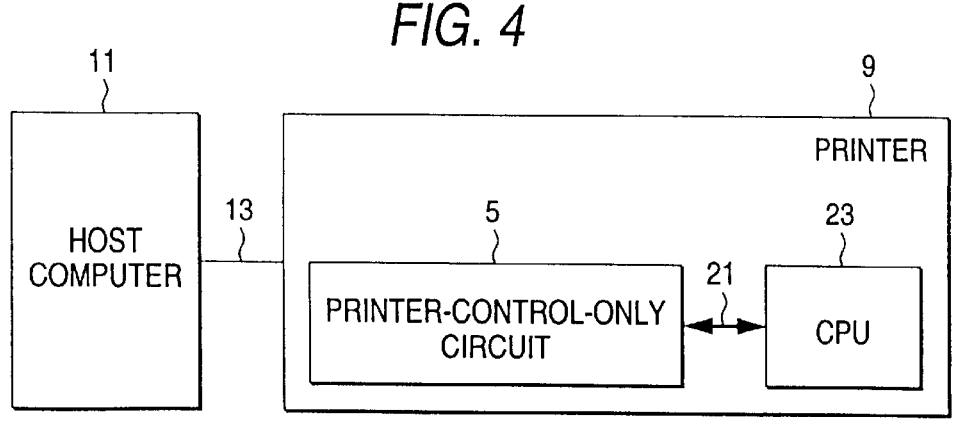
FIG. 4 is a block diagram showing the control circuit when it is built into the printer.

FIGS. 2, 3, and 4 show variations in the layout of the control circuit 5.

As shown in FIG. 2, a first exemplary layout relates to the case where the control circuit 5 is handled as an external circuit. Specifically, a host port of the control circuit 5 is connected to a printer connection port (typically, a parallel port) of the host computer 1 byway of a parallel interface cable 13. Also, the printer 9 is connected to a printer port of the control circuit 5 by way of a parallel interface cable 15. The parallel interface cables 13 and 15 may be replaced by a communications network.

As shown in FIG. 3, a second exemplary layout relates to the case where the control circuit 5 is offered in the form of an optional board to be built into a host computer. Specifically, the printer port of the control circuit 5 is connected to the printer 9 by way of the parallel interface cable 15. The second layout has the advantage of enabling prompt release of the host computer, as well as the advantage of the capability to cope with a plurality of printers. The parallel interface cable 15 may be replaced by a communications network.

As shown in FIG. 4, a third exemplary layout relates to the case where the control circuit 5 is offered in the form of an optical board to be built in to a host computer. Specifically, the control circuit 5 is connected to the host computer 11 by way of the parallel interface cable 13. In the printer 9, the control circuit 5 is connected directly to a bus 21 of a CPU 23. The third layout has the advantage of enabling high-speed processing in the printer, as well as the advantage of having the capability to cope with a plurality of hosts. The parallel interface cable 13 may be replaced by a communications network.

Figure 5:
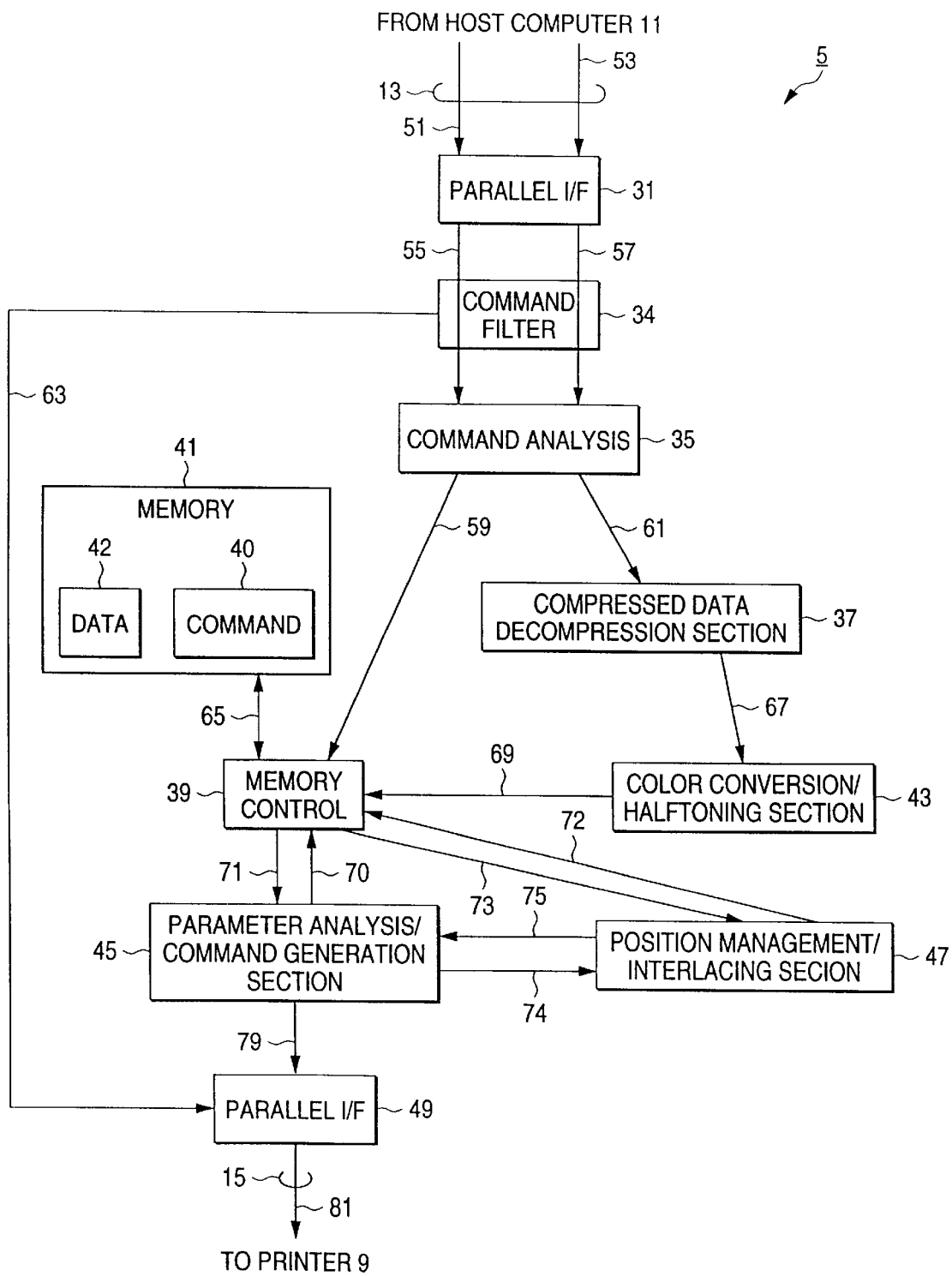
FIG. 5 is a block diagram showing the internal configuration of the control circuit.

FIG. 5 shows the internal configuration of the control circuit 5.

The control circuit 5 has parallel interface sections 31 and 49 and can be connected to the host computer 11 and the printer 9 by way of the parallel interface cables 13 and 15, as shown in FIG. 2. Further, in the case of the layout shown in FIG. 3 or 4, the parallel interface 31 or 49 may be replaced by an interface for CPU bus connection purpose.

The parallel interface section 31 receives a control circuit command from the host computer 11. The control circuit command has a format such as that described below.
[command code] [parameter] [data]

The command codes are as follows:

(1) ESC(G

This command code represents an RGB raster graphic mode start command to be described later.

(2) <xferJ>

This command code represents a data transfer command. The data transfer command comprises three types of commands; namely, a color conversion/halftoning parameter setting command, a backend parameter setting command, and an RGB data transfer command, all of which will be described later.

(3) <eor>

This command code represents a raster end command to be described later.

(4) <FF>

This command code represents a page end command to be described later.

(5) <exit>

This command code represents an RGB raster graphic mode end command to be described later.

Of the foregoing command codes, the codes <eor>, <FF>, and <exit> are not accompanied by parameters or data.

The data transfer command including command code <xferJ> comprises three types of commands; i.e., a color conversion/halftoning parameter setting command, a backend parameter setting command, and an RGB data transfer command. The data transfer command is accompanied by a parameter and data. The parameter includes the effective bit width of the data, the data compression method, device selection representing the address to which the data are transferred, the register address where the data stored in the device are to be stored, and a designation relating to the number of data sets. Through device selection, there can be determined the type of command (of the three types of commands) to which the current data transfer command pertains. The data comprise color conversion/halftoning parameters to be described later, a backend parameter, or full-color RGB raster data.

In FIG. 5, a path 51 entering the parallel interface section 31 represents a command path along which the command code and the parameter are transferred, and a path 53 represents a data path along which data are transferred. A command code and a parameter of the control circuit command entering the parallel interface section 31 are sent to a command analysis section 35 by way of a command path 55. Simultaneously, data of the control circuit command are sent to the command analysis section 35 by way of a data path 57.

The command analysis section 35 stores received control circuit commands into FIFO memory (not shown) provided therein and reads and analyzes the commands in the sequence of receipt, thereby identifying the type of each command. The types of control circuit commands are described as follows, in the sequence in which they are transmitted from the host computer (1) RGB Raster Graphic Mode Start Command This command has a format of "ESC (G" and gives the control circuit 5 an instruction for entering an RGB raster graphic mode. The expression "RGB raster graphic mode" corresponds to a mode in which full-color RGB raster data received from the host computer are converted into binary CMYK raster data, and the thus-converted binary CMYK raster data are output to the printer. Only when the control circuit 5 is in the RGB raster graphic mode, the command analysis section 35 receives the following commands.

(2) Color Conversion/halftoning Parameter Setting Command

This command has a format of "<xferJ>parameter data" and gives the control circuit 5 an instruction for setting in a color conversion/halftoning section 43 a parameter (hereinafter referred to as a "color conversion/halftoning parameter") required for color conversion and halftoning. The device selection included in the parameter of the command designates the color conversion/halftoning section 43, and the data of the command correspond to the foregoing color conversion/halftoning parameter. For example, a typical color conversion/halftoning parameter comprises various types of look-up tables, such as an RGB/CMYK conversion table for color conversion, a dither threshold matrix used for dithering, and a γ correction table for γ correction.

(3) Backend Parameter Setting Command

The command has a format of "<xferJ> parameter data" and gives the control circuit 5 an instruction for setting, in a related section of the control circuit 5 (typically a position management/interlacing section 47 to be described later) or in the printer, various parameters required for correctly controlling a printing mechanism of the printer (e.g., a print head, a carriage, or a sheet feeder of an ink-jet printer) such that dots are printed on a sheet. The parameter is required by a processing module downstream of the color conversion/halftoning section 43 (i.e., a backend program). In this sense, the parameter is called a "backend parameter." The device selection in the parameter of the command designates a backend, and the data of the command correspond to the backend parameter. For example, the backend parameter includes the horizontal and vertical resolution of a CMYK raster image, the number of dots in one raster (one horizontal line), the number of vertical dots on one page, page length, top/bottom/left margins, the nominal amount of paper feed, designation of dot size, designation of either mono-directional printing or bi-directional printing, the number of paths (or nozzle pitch) to be used when interlace printing is carried out, the number of nozzles to be used, and a modified amount of paper feed.

(4) RGB Data Transfer Command

This command has a format of "<xferJ> parameter data" and gives the control circuit 5 an instruction for supplying to the control circuit 5 full-color RGB raster data for every raster (every horizontal line) on a page and subjecting the raster data to color conversion and halftoning. The device selection in the parameter of the command designates the color conversion/halftoning section 43, and the data of the command correspond to the full-color RGB raster data for one raster (or for each of the segments formed through separation of a single raster)

(5) Raster End Command

This command has a format of "<eor>" and reports the end of a single raster.

(6) Repetition of Sections (4) and (5)

The RGB data transfer command and the raster end command are repeatedly transmitted until the final raster within the page is reached.

(7) Page End Command

This command has a format of "<FF>" and reports a form feed.

(8) Repetition of Sections (2) Through (7)

The sections (2) through (7) are repeated until the final page of the print job is reached. The commands referred to in sections (2) and (3) may be arranged so as to be sent only once at the beginning of the print job.

(9) RGB Raster Graphic Mode End Command

This command has a format of "<exit>" and reports the end of the RGB raster graphic mode. After completion of the RGB raster graphic mode, the command analysis section 35 receives no other commands until it receives the next RGB raster graphic mode start command.

From the command code of the received control circuit command or the command code and the parameter of the same, the command analysis circuit 35 identifies the type of command. More specifically, from the command code, the command analysis section 35 determines whether the received control circuit command is an RGB raster graphic mode start command, the data transfer command, the raster end command, the page form command, or the RGB raster graphic mode end command. In the case of the data transfer command, the command analysis section 35 determines, from the device selection included in the parameter, whether the data transfer command is a backend parameter setting command or another command (e.g., a color conversion/halftoning parameter setting command or an RGB data transfer command).

The operations performed by the command analysis section 35 vary according to the result of identification of the command. The operations will now be described in the sequence in which the commands are received.

(1) First, a command code "ESC(G"; i.e., the RGB raster graphic mode start command, is received. Upon identification of the command code, the command analysis section 35 enters the RGB raster graphic mode and becomes ready to receive subsequent commands.

(2) Next, a command code "<xferJ>"; i.e., a data transfer command, is received. Upon receipt of this command, the command analysis section 35 analyzes the parameter of the command code. From the device selection included in the parameter, the command analysis section 35 identifies the device to which the data are to be sent. Of the three types of data transfer commands set forth, the color conversion/halftoning parameter setting command is received first, and the device selection included in this command designates the color conversion/halftoning section 43. Upon receipt of this command, the command analysis section 35 sends to the color conversion/halftoning section 43 a register address included in the parameter of the command and the data of the command (i.e., the color conversion/halftoning parameter), by way of a path 61, a compressed data decompression section 37, and a path 67. In the color conversion/halftoning section 43, the halftoning parameter is sent to the designated register address. As a result, the configuration of the color conversion/halftoning section 43 is set so that full-color RGB raster data, which will be received later, can be correctly subjected to color conversion and halftoning.

(3) After completion of receipt of all the color conversion/halftoning parameter setting commands, the backend parameter setting command is received. The device selection included in the command designates a backend. Upon receipt of this command, the command analysis section 35 sends to the memory control section 39 the register address included in the parameter of the command and data of the command (i.e., a backend parameter), by way of a path 59.

(4) After completion of receipt of all the color conversion/halftoning parameter setting commands, the RGB data transfer command is received. The device selection included in the RGB data transfer command designates the color conversion/halftoning section 43. The command analysis section 35 sends to the color conversion/halftoning section 43 the register address included in the parameter of the command and the data of the command (i.e., full-color RGB raster data), by way of the path 61, the compression data decompression section 37, and the path 67. As a result, the color conversion/halftoning section 43 converts the full-color RGB raster data into binary CMYK raster data.

(5) Subsequent to the RGB data transfer command for a single raster, a command code of "<eor>"; i.e., a raster end command, is received. The command analysis section 35 sends the raster end command to the memory control section 39 by way of the path 59. Since the RGB data transfer command and the raster end command repeatedly enter the command analysis section 35; i.e., once for every raster included on a single page, the command analysis section 35 repeatedly performs the operations relating to sections (4) and (5).

(6) Receipt of the next command data of "<FF>"; i.e., a page end command, follows the receipt of the raster end command regarding the final raster for a single page. Upon receipt of the page end command, the command analysis section 35 refrains from receiving a new command from the host until it receives from the parameter analysis command generation section 45 a report stating that transfer of all the data sets regarding the previous page to the printer has finished. Upon receipt of the report, the command analysis section 35 commences receipt of commands for the next page.

(7) Receipt of a command code of "<exit>"; i.e., an RGB raster graphic mode end command, follows the receipt of the page end command regarding the final page of the print job. Upon receipt of the RGB raster graphic mode end command, the command analysis section 35 completes the RGB raster graphic mode and, from then on, does not receive any command at all other than the command "ESC(G"; i.e., the RGB raster graphic mode start command. Received commands other than the RGB raster graphic mode start command are directly transmitted to the printer by way of a path 63.

The compressed data decompression section 37 decompresses the data received from the command analysis section 35 (i.e., the color conversion/halftoning parameter or the full-color RGB raster data), if the data are in a compressed state. If the data are not compressed, the data are directly sent to the color conversion/halftoning section 43.

As is obvious from the foregoing description, the color conversion/halftoning section 43 receives various types of color conversion/halftoning parameters and their register addresses and subsequently receives full-color RGB data for each raster and their register addresses. The color conversion/halftoning section 43 stores the halftoning parameter into a specified register address, so that the color conversion/halftoning section 43 is configured so as to be able to correctly carry out color conversion and halftoning. Subsequently, the color conversion/halftoning section 43 converts the received full-color RGB raster data into binary CMYK raster data through color conversion and halftoning and sends the thus-converted binary CMYK raster data to the memory control section 39 by way of a path 69.

As is evident from the previous description, the memory control section 39 receives a backend parameter and its register address from the command analysis section 35 by way of the path 61. Subsequently, the binary CMYK raster data for each raster are received from the color conversion/halftoning section 43 by way of the path 69. Further, every time the binary CMYK raster data of each raster are completed, the raster end command is received from the command analysis section 35 by way of the path 61. The memory control section 39 stores the received binary CMYK raster data regarding each raster into a data region 42 within the memory 41. The end of each raster is determined from the raster end command.

Immediately after entering the RGB raster graphic mode, the memory control section 39 receives a command request 70 from the parameter analysis/command generation section 45 to be described later. After having written the backend parameter and its register address into the command region 40 of the memory 41, the memory control section 39 reads the backend parameters and their register addresses from the command region 40 in the sequence in which they are written, in response to the command request 70. The thus-read backend parameter and its register address are transmitted to the parameter analysis/command generation section 45 by way of a path 71. After having finished transferring all the backend parameters, the memory control section 39 receives a data request 72 from the position management/interlacing section 47 by way of a path 73.

First, the parameter analysis/command generation section 45 issues the command request 70 to the memory control section 39, thereby receiving the backend parameter and its register address stored in the command region 42 from the memory control section 39 by way of the path 71. The parameter analysis/command generation section 45 stores the thus-received backend parameter in a register address specified therein. After having finished storing all the backend parameters into the registers therein, the parameter analysis/command generation section 45 sends to the position management/interlacing section 47 the parameters required by the position management/interlacing section 45 to be described later, from among the backend parameters (in reality, substantially all the backend parameters), by way of a path 73. As a result, the position management/interlacing section 47 is configured. In short, a specification for interlace printing or overlap printing can be determined on the basis of the backend parameter, as will be described later.

In response to the data request from the parameter analysis/command generation section 45, the position management/interlacing section 45 sends the data request 72 to the memory control section 39. In response to the data request 72, the memory control section 39 reads the binary CMYK raster data from the data region 42. The position management/interlacing section 47 receives the thus-read CMYK raster data by way of the bus 73 and sends the thus-received raster data to the parameter analysis/command generation section 45 by way of the path 75. During the foregoing operation, the position management/interlacing section 47 sets, on the basis of the initially-set backend parameter and for each path (horizontal scanning) of the print head, specifications for interlace printing and overlap printing optimum for an image to be printed; more specifically, the number of raster whose dots (pixels) are generated by dot formation elements (e.g., ink-jet nozzles) of the print head of the printer 9 and the number of dot pitches between the dots. The position management/interlacing section 47 sends to the memory control section 39 a request for the thus-determined CMYK raster data regarding the dots (pixels) to be generated by the individual dot formation elements and receives the data. Null data regarding dots not to be generated are added to the thus-received CMYK data, thereby generating CMYK data to be imparted to the individual dot formation elements for each path. The thus-generated CMYK data are sent to the parameter analysis/command generation section 45. As mentioned above, the position management/interlacing section 47 determines, on the basis of the backend parameter, specifications for optimum interlace printing and overlap printing. When printing operations are performed according to the specifications, binary CMYK interlaced raster data required by the print head are prepared, and the thus-prepared CMYK interlaced raster data are sent to the parameter analysis/command generation section 45.

The parallel interface section 49 receives the printer command from the parameter analysis/command generation section 45 and sends the printer command to the printer 9.

By means of the foregoing configuration, the process of generating the initial setting command to be sent to the printer 9 and the process of generating the CMYK data transmission command are as follows.

(1) Process of Generating an Initial Setting Command

The backend parameter setting command transmitted from the host computer 11 is analyzed by the command analysis section 35. The backend parameter, i.e., the data of the command, is sent to the memory control section 39 by way of the path 59. The memory control section 39 temporarily stores the thus-received backend parameter to the command region 40 within the memory 41. In response to the command request 70 from the parameter analysis/command generation section 45, the backend parameter is read from the command region 40, and the thus-read parameter is sent to the parameter analysis/command generation section 45 by way of the path 71. The parameter analysis/command generation section 45 sets the thus-received backend parameter in the internal register. Further, the parameter analysis/command generation section 45 sends to the position management/interlacing section 47 the backend parameter required for determining specifications for interlace printing and overlap printing. The backend parameter required for resetting the printer 9 is sent to the printer 9 in the form of the printer initial setting command by way of the parallel interface section 49. The initial setting command is transmitted only once for one page (or only once for one job).

(2) Process of Generating CMYK Data Transmission Command

The color conversion/halftoning parameter setting command transmitted from the host computer 11 is analyzed by the command analysis section 35. The color conversion/halftoning parameter of the command is sent to the color conversion/halftoning section 43 byway of the compressed data decompression section 37. The color conversion/halftoning section 43 stores the color conversion/halftoning parameter into the internal register, so that the color conversion/halftoning section 43 is set so as to be able to correctly process full-color RGB raster data. Subsequently, the RGB data transfer command transmitted from the host computer 1 is analyzed by the command analysis section 35, and the data resulting from analysis, i.e., the full-color RGB raster data (usually in a compressed state) are sent to the color conversion/halftoning section 43 byway of the compressed data decompression section 37 (where the data are decompressed to the original form thereof). The color conversion/halftoning section 43 converts the thus-received full-color RGB raster data into binary CMYK raster data and sends the CMYK raster data to the memory control section 39 by way of the path 69. The memory control section 39 temporarily stores the thus-received binary CMYK raster data into the data region 42 within the memory 41. In response to the data request 72 from the position management/interlacing section 47, the memory control section 39 selectively reads from the data region 42 the binary CMYK raster data regarding the dots (pixels) to be generated by means of the print head for each path, and sends the thus-read binary CMYK raster data to the position management/interlacing section 47. The position management/interlacing section 47 prepares, from the thus-received binary CMYK raster data, binary CMYK interlacing raster data required by the.print head for each path. The thus-prepared binary CMYK interlaced raster data are sent to the parameter analysis/command generation section 45. The parameter analysis/command generation section 45 converts the thus-received binary CMYK interlaced raster data for each path into the CYMK raster data transmission command to be sent to the printer 9. The thus-converted CYMK raster data transmission command is then transmitted to the printer 9 by way of the parallel interface section 49. Further, the parameter analysis/command generation section 45 prepares a paper feed command after the CMYK raster data transmission command for each path and transmits the command to the printer 9.

In the previously-described control circuit 5, it is to be noted that initial setting of configuration of the control circuit 5 for the purpose of correctly generating the configuration of the control circuit 5 as well as generation of a printer command are carried out on the basis of the command from the host computer. More specifically, the color conversion/halftoning section 43 is reset by means of the color conversion/halftoning parameter setting command. As mentioned above, configuration for the control circuit 5 can be set by means of the parameter setting command from the host computer. Hence, the specific details of the color conversion and halftoning operations performed by the control circuit 5 and the specific details of interlace printing and overlap printing can be controlled by means of a printer driver. For example, according to the type of printer or the type of an image to be printed, optimum configuration can be set for the control circuit 5 by means of a command from the printer driver. Accordingly, the control circuit 5 of identical hardware configuration can be applied to different types of printers and to printing of an image of different characteristics. In short, the control circuit 5 is general purpose.

The foregoing control circuit 5 is configured so as to be applied to a case where a conventional printer driver which produces only a printer command is used with a host computer. More specifically, after having exited from the RGB raster graphic mode, the command analysis section 35 of the control circuit 5 does not interpret any command unless it receives again the RGB raster graphic mode start command "ESC(G." In a preceding stage of the command analysis section 35, the command filter 34 catches a command other than the foregoing commands sent from the host computer during the RGB raster graphic mode and sends the thus-received command to the parallel interface section 49 by way of the through path 63, without sending the command to the command analysis section 35. The parallel interface section 49 sends the command directly to the printer 9. Accordingly, the printer command issued by the conventional printer is sent to the printer 9 by bypassing the control circuit 5, thereby driving the printer 9 in the same manner as the conventional printer. The command sent from the host computer during the RGB raster graphic mode is distinguished from the other commands by, for example, the host computer appending to a packet of the command an ID for distinguishing a command of the RGB raster graphic mode from the other commands, and by sending the packet having the ID. Alternatively, the command filter 34 may identify the command from the packet ID, or the host computer may send the command of the RGB raster graphic mode and the other commands by way of different logic channels (e.g., through use of different protocols), thereby identifying the command from the logic channel.

In the foregoing control circuit 5, the backend parameter received from the host computer is sent to the parameter analysis/command generation section 45 by way of a route independent of the route of processing the RGB raster data. Accordingly, the initial setting of the control circuit 5 and the printer 9 on the basis of the backend parameter can have been completed prior to generation of CMYK raster data without fail, thereby rendering printing operations more efficient.

Figure 6:
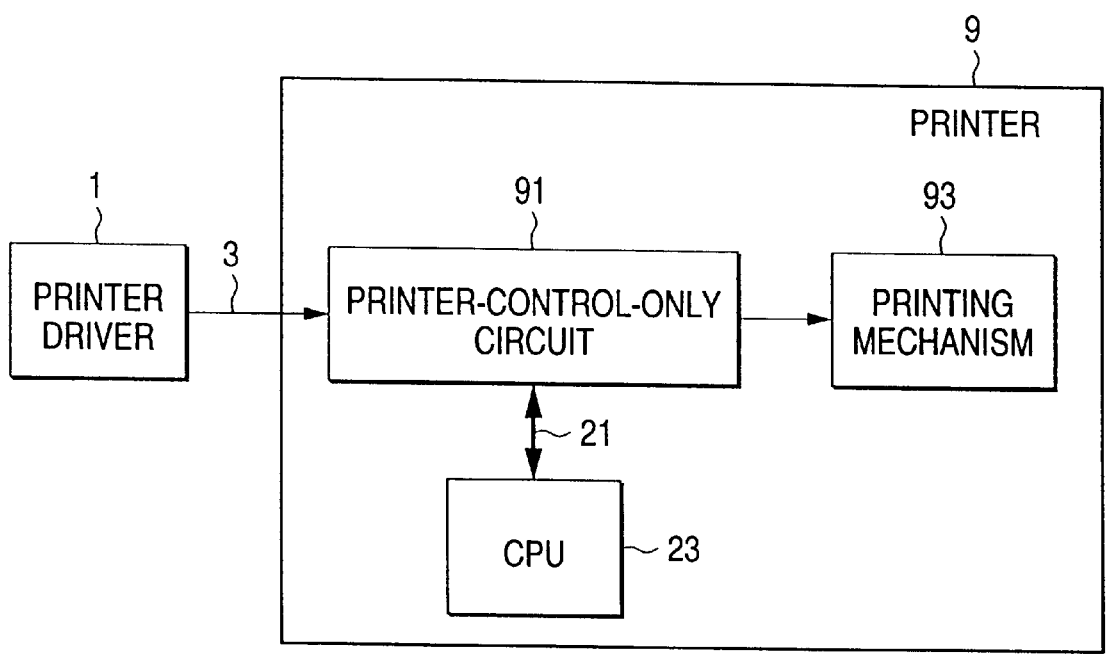
FIG. 6 is a block diagram showing a print system according to another embodiment of the present invention.

FIG. 6 is a block diagram showing another embodiment of the present invention.

In the present embodiment, as in the case with the control circuit 5 shown in FIG. 4, a control circuit 91 is built in the printer 9 and is connected to the bus 21 of the CPU 23 of the printer 9. However, the control circuit 91 directly drives a print mechanism 93 (a print head of an ink-jet printer or a print engine of a laser printer) on the basis of binary CMYK raster data received from the control circuit command 3 rather than converting the control circuit command 3 received from the printer driver 1 into a printer command and sending the printer command to the CPU 23. Accordingly, the CPU 23 is not required to be directly involved in processing image data. However, in a case where a conventional printer driver is used, the control circuit 91 transfers the printer command received from the conventional printer driver directly to the CPU 23, and the CPU 23 processes the printer command in the same manner as in the conventional printer.

Figure 7:
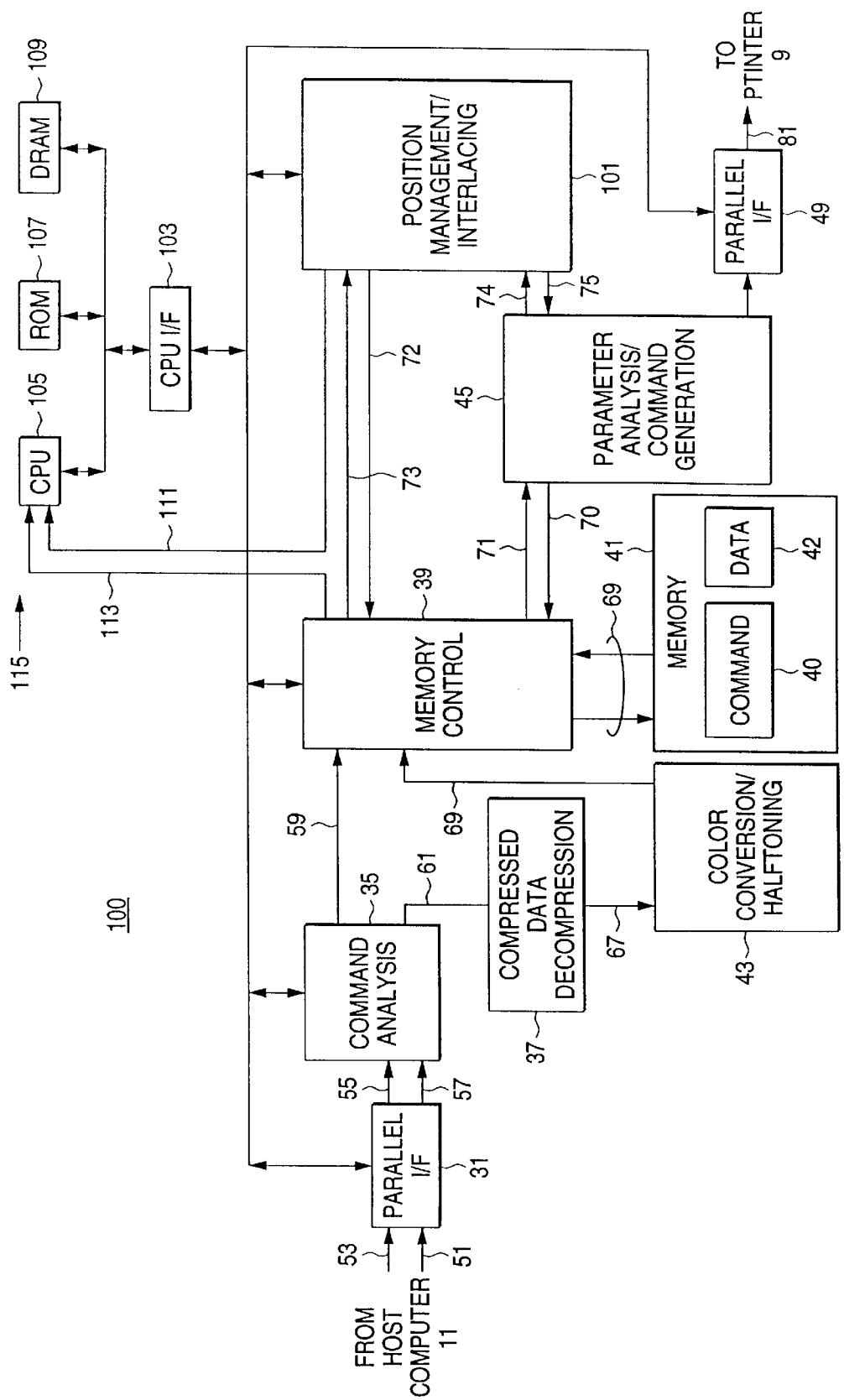
FIG. 7 is a block diagram showing a print system according to still another embodiment of the present invention.

FIG. 7 shows a block diagram showing a control circuit according to still another embodiment of the present invention. The elements which are substantially identical in function to those shown in FIG. 5 are assigned the same reference numerals. Repetition of their explanations will be omitted here.

A control circuit 100 shown in FIG. 7 comprises a micro computer 115 including a CPU 105, program ROM 107, and work DRAM 109, in addition to a special-purpose hardware circuit including an ASIC and a semiconductor memory chip. The microcomputer 115 and special-purpose hardware circuit elements, 31, 35, 37, 39, 43, 45, 49, and 101 formed from other ASICs are connected together by way of a CPU interface section 103.

The primary role of the microcomputer 115 is to assist the position management/interlacing section 101. More specifically, of the processing operations performed by the position management/interlacing section 47 shown in FIG. 5, the microcomputer 115 undertakes an processing operation of determining, on the basis of the backend parameter, the dots (pixels) to be printed by the dot generation elements for each path (i.e., determination of specifications optimum for interlace printing and overlap printing). The position management/interlacing section 101 undertakes the remaining processing operations. Since an algorithm for determining specifications for interlace printing and overlap printing is considerably complicated, it is better to implement the algorithm as software by means of a microcomputer instead of as special-purpose hardware, thereby enabling determination of optimum specifications. Further, since the amount of processing required by determination of specifications is not large, a considerably inexpensive one-chip microcomputer sufficiently acts as the microcomputer 115, thereby preventing an increase in cost.

Procedures related to the processing performed by the microcomputer 115 and the position management/interlacing section 101 are as follows:

(1) From the parameter analysis/command generation section 45, the position management/interlacing section 101 receives a backend parameter required for determining specifications for interlace printing and overlap printing, and the thus-received parameter is transferred to the CPU 105.

(2) From the parameter analysis/command generation section 45, the position management/interlacing section 101 receives a specification preparation request which is the first request in a page. In response to the request, the position management/interlacing section 101 issues an interrupt request to the CPU 105. In response to the interrupt request, the CPU 105 determines a specification for one path on the basis of the backend parameter. This specification comprises a table (hereinafter referred to as an "interlace table") that specifies the vertical position of the path within a page (i.e., the amount of paper feed) and the number of raster and the dots of the raster (e.g., only odd-numbered dots or even-numbered dots) to be printed by the individual dot generation elements of the print head for one path.

(3) From the CPU 105, the position management/interlacing section 101 receives the vertical position and the interlace table. In response to the request from the parameter analysis/command generation section 45, the vertical position is transferred to the parameter analysis/command generation section 45, and the interlace table is transferred to the memory control section 39. The memory control section 39 stores the interlace table into the memory 41.

(4) The position management/interlacing section 101 receives, from the memory control section 39, information regarding the interlace table related to the individual dot formation elements. In response to the raster data request from the parameter analysis/command generation section 45, the position management/interlacing section 101 gives the memory control section 39 a request for CMYK raster data regarding the dots specified by the information and receives the raster data. Null data regarding dots not to be printed are added to the raster data, and the thus-added raster data are transferred to the parameter analysis/command generation section 45.

(5) For the second path or later, the position management/interlacing section 101 spontaneously issues an interrupt request 111 to the CPU 105 and repeatedly performs the operations related to sections (3) and (4).

Figure 8:
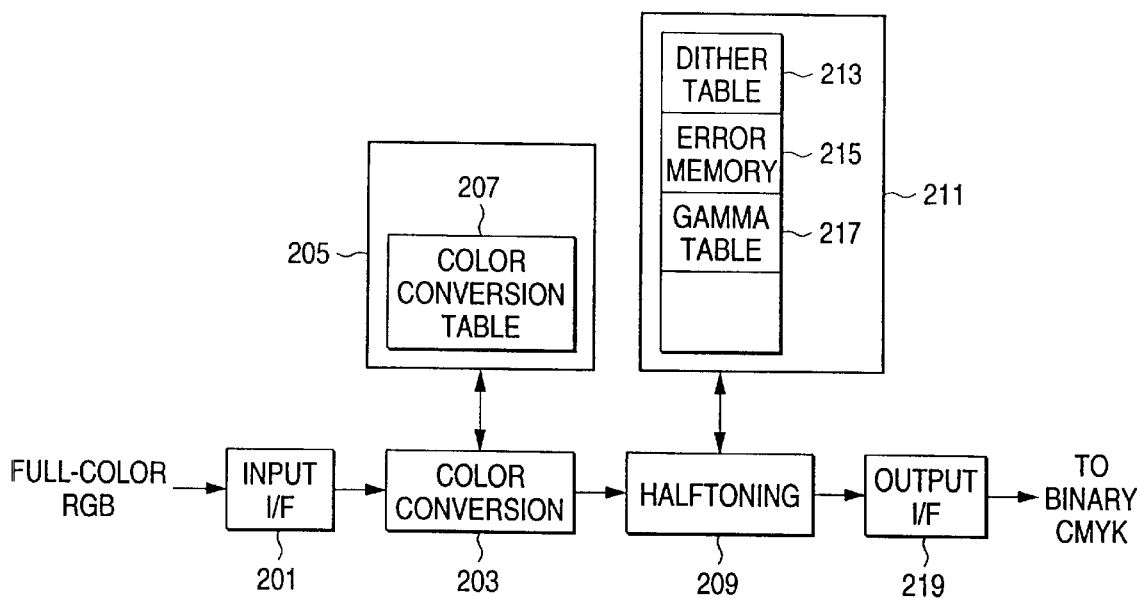
FIG. 8 is a block diagram showing an internal configuration of color conversion/halftoning section.

FIG. 8 shows the internal configuration of the color conversion/halftoning section.

Full-color RGB raster data are first input to a color conversion section 203 by way of an input interface 201. In an internal memory region 205 of the color conversion section 203, there is previously set a color conversion table 207 representing a relationship of conversion of values from the RGB color system to the CMYK color system. By reference to the color conversion table 207, the color conversion section 203 converts the input full-color RGB raster data into the multi-valued CMYK raster data of full-color (or few number of colors). The multi-valued CMYK raster data re input to the halftoning section 207. A dithering table 213 to be used for dithering and a gamma table 207 to be used for (correction are set beforehand in an internal memory region 211 of the halftoning section 207, by means of the previously-described color conversion/halftoning parameter setting command. To carry out error variation, error memory 215 for storing varied errors is ensured. A halftoning section 209 subjects the multi-valued CMYK raster data to gamma correction, by reference to the gamma table 217. Further, the halftoning section 209 converts the gamma-corrected multi-valued CMYK raster data into binary CMYK raster data, by reference to the dithering table 213 or through use of the error memory 215. The binary CMYK raster data are output to an output interface section 219.

Figure 9:
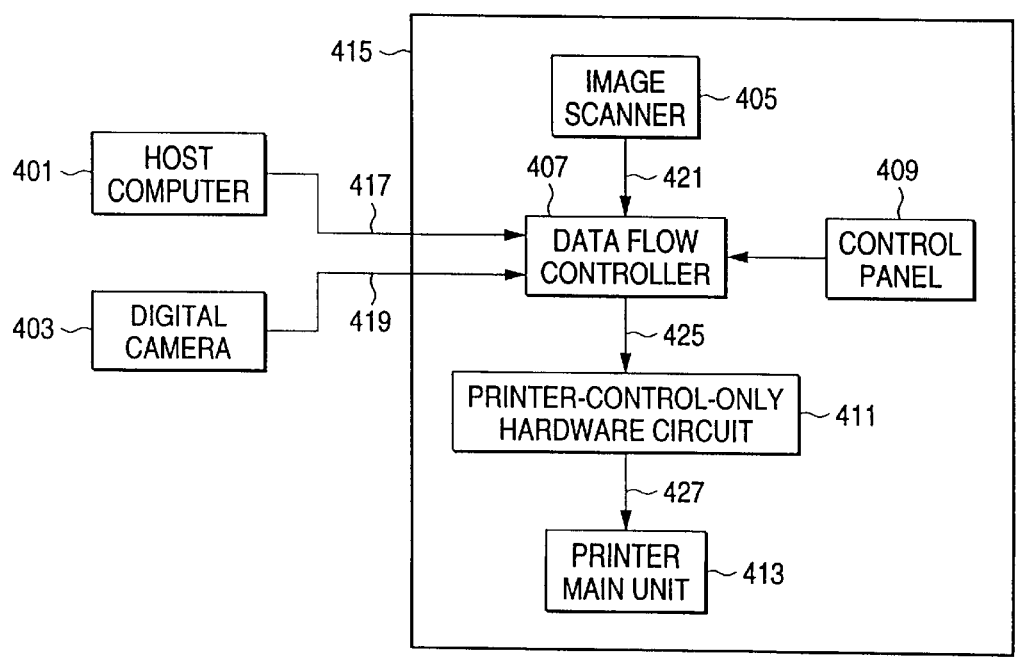
FIG. 9 is a block diagram showing the configuration of a print system according to yet another embodiment of the present invention.

FIG. 9 shows system configuration according to yet another embodiment of the present invention.

A data flow controller 407 is disposed upstream of a printer-control-only circuit (control circuit) 411. The data flow controller 407 can be connected to three types of host apparatus, such as a host computer 401, a digital camera 403, and an image scanner 405. In the present embodiment, the image scanner 405, the data flow controller 407, the control circuit 411, and a printer main unit 413 are housed in one housing as a single printer 415. The data flow controller 407 is also connected to a control panel 409 of the printer 415. The digital camera 405 is connected to the printer 415, only when necessary.

To carry out printing operations through use of the host computer 401, the host computer 401 generates a series of control circuit commands through use of an internal printer driver and sends the thus-generated commands to the data flow controller 407 as indicated by arrow 417. The data flow controller 407 transfers the control circuit commands directly to the control circuit 411 as indicated by arrow 4256. The control circuit 411 generates printer commands from the control circuit commands and sends the thus-generated commands to the printer main unit 413 as indicated arrow 427.

In principle, the image scanner 403 and the digital camera 405 output only full-color RGB data and have no function of generating the control circuit commands. Upon receipt from the control panel 409 a designation of mode in which printing is carried out through use of the image scanner 405 or the digital camera 403, the data flow control circuit 407 reads the full-color RGB raster image data from the image scanner 405 or the digital camera 403 as indicated by arrow 421 or 419. According to the printing conditions specified by the user by way of a control panel, the data flow controller 407 generates a series of control circuit commands to be used for printing RGB raster image and sends the thus-generated commands to the control circuit 411 as indicated by arrow 425. From the control circuit commands, the control circuit 411 generates the printer commands as mentioned previously, and sends the thus-generated printer commands to the printer main unit 413 as indicated by arrow 427.

In this way, printing can be carried out through use of any one of the host computer 401, the digital camera 403, and the image scanner 405.

As has been described above, the foregoing embodiments have been presented only for the purpose of illustration of the present invention and are not intended to limit the present invention solely to these embodiments. Therefore, the present invention can be implemented in various forms other than the foregoing embodiments.

What is claimed is:

1. A printer controller provided between a host device which produces high-order raster image data and a printer which forms a printed image on the basis of low-order raster image data, the controller comprising:

a host interface section for connecting the printer controller to the host device;

a printer interface for connecting the printer controller to the printer;

a command analysis section which, through analysis of a control circuit command entered from the host device by way of the host interface section, identifies (i) an image data command including the high-order raster image data; and (ii) an image conversion parameter required for converting the high-order raster image data into the low order raster image data, and which transfers the high-order raster image data included in the image data command and the image conversion parameter included in the image conversion parameter setting command;

an image conversion section which retains the image conversion parameter transmitted from the command analysis section and converts the high-order raster image data transmitted from the command analysis section to the low-order raster image data through image conversion on the basis of the thus-retained image conversion parameter, and which transmits the low-order raster image data; and a printer control information generation section which sends the low-order raster image data transmitted from the image conversion section to the printer by way of the printer interface.

2. The printer control circuit as defined in claim 1, wherein the command analysis section identifies a backend parameter setting command in addition to the image data command and the image conversion parameter setting command;

the backend parameter includes a backend parameter required for producing the print image on the basis of the low-order raster image data;

the command analysis section transfers the backend parameter included in the backend parameter setting command to the printer control information generation section;

before sending the low-order raster image data to the printer, the printer control information generates, from the backend parameter transmitted from the command analysis section, printer setting information to be used for resetting the printer and sends the printer setting information to the printer by way of the printer interface.

3. The printer controller as defined in claim 1, wherein the host interface section can be connected to a bus of a host CPU provided within the host device.

4. The printer controller as defined in claim 1, wherein the printer interface can be connected to a bus of a printer CPU provided within the printer.

5. The printer controller as defined in claim 2, wherein the printer control information generation section has a command memory region for temporarily storing the backend parameter transmitted from the command analysis section and a data memory region for temporarily storing the low-order raster image data transmitted from the image conversion section, and the printer control information section reads the backend parameter from the command memory region, generates the printer control information on the basis of the backend parameter, sends the thus-generated printer control information to the printer, reads the low-order raster image data from the data memory region, and sends the thus-read low-order raster image data to the printer.

6. The printer controller as defined in claim 2 or 5, wherein the printer control information generation section has a position management section which determines, on the basis of the backend parameter transmitted from the command analysis section, specifications for interlace printing or overlap printing and which generates, on the basis of the thus-determined specifications, interlace low-order raster image data to be used for performing the interlace printing or overlap printing by the printer, from the low-order raster image data transmitted from the image conversion section; and wherein the interlace low-order raster image data output from the position management section are sent to the printer.

7. The printer controller as defined in claim 6, wherein the printer control information generation section comprises:

a CPU for determining specifications for interlace printing or overlap printing on the basis of the backend parameter; and a special-purpose hardware circuit which generates, on the basis of the backend parameter, the printer control information and sends the thus-generated printer control information to the printer and which generates, on the basis of the determined specifications, the interlace low-order raster image data, and sends the thus-generated interlace low-order raster image data to the printer.

8. The printer controller as defined in claim 2, wherein the printer control information generation section sends the printer setting information and the low-order raster image data to the printer respectively in their predetermined printer command formats.

9. The printer controller as defined in claim 1, further comprising means which, when receiving a printer command differing from the control circuit command from the host device, sends the printer command directly to the printer by way of the printer interface.

10. The printer control circuit as defined in claim 1, wherein the high-order raster image data has a different type color space than the low-order raster image data.

11. A printer control method comprising:

connecting a printer controller to a host device, wherein the printer controller includes, identifying an image data command that includes high-order raster-image data, received from the host device;

identifying an image conversion parameter setting command that includes an image conversion parameter required for converting the high-order raster image data into low order raster image data, received from the host device; and supplying the image conversion parameter and the high-order raster image data to a hardware circuit specifically designed for image conversion purpose;

retaining the image conversion parameter; and converting the high-order raster image data to low-order raster image data of a printer color system through image conversion, on the basis of the thus-retained image conversion parameter.

12. The printer control method as defined in claim 11, further comprising:

wherein the host device includes:
generating a backend parameter required for printing the low-order raster image data; and
supplying the backend parameter to the hardware circuit;

wherein the hardware circuit includes:
generating printer setting information required for resetting a printer, on the basis of the backend parameter; and
sending the printer setting information to the printer before transmission of the low-order raster image data to the printer.

13. The printer control method as defined in claim 11, wherein the high-order raster image data has a different type color space than the low-order raster image data.

14. A print system comprising:

a host device for generating an image data command including high-order raster image data and an image conversion parameter setting command including an image conversion parameter required for converting the high-order raster image data into a low-order raster image;

a printer controller having a hardware circuit specifically designed for image conversion which receives an image conversion parameter setting command from the host device, retains the image conversion parameter included in the image conversion parameter setting command, receives an image data command from the host device, and converts the high-order raster image data into the low-order raster image data through image conversion of the high-order raster image data included in the image data command, on the basis of the retained image conversion parameter; and a printer which receives the low-order raster image data from the printer controller and performs printing operations.

15. The print system as defined in claim 14, wherein the host device generates, on the basis of the low-order raster image data, a backend parameter setting command including a backend parameter required for forming the print image, in addition to the image data command and the image conversion parameter setting command; and the printer controller generates, on the basis of the backend parameter received from the host device, printer setting information required for resetting the printer before sending the low-order raster image data to the printer.

16. The print system as defined in claim 14, wherein the high-order raster image data has a different type color space than the low-order raster image data.

* * * * *